US010234730B2

(12) United States Patent
Higano et al.

(10) Patent No.: US 10,234,730 B2
(45) Date of Patent: Mar. 19, 2019

(54) LIQUID CRYSTAL DISPLAY DEVICE

(71) Applicant: Japan Display Inc., Minato-ku (JP)

(72) Inventors: Emi Higano, Tokyo (JP); Toshiyuki Higano, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/388,545

(22) Filed: Dec. 22, 2016

(65) Prior Publication Data

US 2017/0176802 A1   Jun. 22, 2017

(30) Foreign Application Priority Data

Dec. 22, 2015   (JP) .................................. 2015-250020

(51) Int. Cl.
*G02F 1/1339* (2006.01)
*G02F 1/1341* (2006.01)
*G02F 1/1333* (2006.01)

(52) U.S. Cl.
CPC ........ *G02F 1/13394* (2013.01); *G02F 1/1339* (2013.01); *G02F 1/1341* (2013.01); *G02F 2001/13396* (2013.01); *G02F 2001/133357* (2013.01); *G02F 2202/28* (2013.01)

(58) Field of Classification Search
CPC .................................................... G02F 1/13394
See application file for complete search history.

(56) References Cited

U.S. PATENT DOCUMENTS

| | | | | |
|---|---|---|---|---|
| 2002/0196393 A1* | 12/2002 | Tashiro | ................. | G02F 1/1303 349/106 |
| 2004/0160566 A1* | 8/2004 | Kawabe | ................. | G02F 1/1341 349/153 |
| 2005/0248715 A1* | 11/2005 | Byun | .................... | G02F 1/1303 349/187 |
| 2008/0151172 A1* | 6/2008 | Kondo | .................. | G02F 1/1339 349/153 |
| 2009/0279041 A1* | 11/2009 | Kurozumi | ........... | G02F 1/13394 349/156 |
| 2010/0007842 A1* | 1/2010 | Terao | .................... | G02F 1/1339 349/153 |

(Continued)

FOREIGN PATENT DOCUMENTS

| | | |
|---|---|---|
| JP | 2003-315810 | 11/2003 |
| JP | 2010-210832 | 9/2010 |
| JP | 2016-177080 | 10/2016 |

*Primary Examiner* — Sang V Nguyen
(74) *Attorney, Agent, or Firm* — Oblon, McClelland, Maier & Neustadt, L.L.P.

(57) ABSTRACT

According to one embodiment, a liquid crystal display device includes an array substrate, a counter substrate, an adhesive layer, a liquid crystal layer, a frame portion, and first and second barrier members. The first barrier member includes a first wall portion having a frame shape and provided on a surface of the array substrate opposing the counter substrate, and first pillar portions arranged spaced apart from each other and each having opposite end faces abutting against the first wall portion and the counter substrate. The second barrier member includes a second wall portion having a frame shape and provided on a surface of the counter substrate opposing the array substrate, and second pillar portions arranged spaced apart from each other and each having opposite end faces abutting against the second wall portion and the array substrate.

20 Claims, 3 Drawing Sheets

(56) References Cited

U.S. PATENT DOCUMENTS

| | | | |
|---|---|---|---|
| 2010/0097560 A1* | 4/2010 | Ikeguchi | G02F 1/1339 349/155 |
| 2010/0103364 A1* | 4/2010 | Choi | G02F 1/13394 349/157 |
| 2011/0222013 A1* | 9/2011 | Kawanishi | G02F 1/1339 349/153 |
| 2012/0120337 A1* | 5/2012 | Ji | G02F 1/133514 349/39 |
| 2014/0043574 A1* | 2/2014 | Ichimura | G02F 1/1339 349/138 |
| 2014/0347612 A1* | 11/2014 | Park | G02F 1/133514 349/106 |
| 2015/0029432 A1* | 1/2015 | Ishikawa | G02F 1/13394 349/43 |
| 2015/0261030 A1* | 9/2015 | Chen | G02F 1/1339 349/106 |
| 2015/0261050 A1* | 9/2015 | Chen | G02F 1/134336 349/42 |
| 2016/0011445 A1* | 1/2016 | Chen | G02F 1/1337 349/110 |
| 2016/0195741 A1* | 7/2016 | Shiau | G02F 1/1337 349/106 |
| 2016/0274403 A1* | 9/2016 | Araki | G02F 1/13394 |

* cited by examiner

LIQUID CRYSTAL DISPLAY DEVICE

CROSS-REFERENCE TO RELATED APPLICATIONS

This application is based upon and claims the benefit of priority from Japanese Patent Application No. 2015-250020, filed Dec. 22, 2015, the entire contents of which are incorporated herein by reference.

FIELD

Embodiments described herein relate generally to a liquid crystal display device.

BACKGROUND

Taking the advantages of features, such as lightweight, thin screen, and low power consumption, liquid crystal display devices are used as the displays of, for example, OA devices, such as a personal computer, and the displays of a television, a portable device, a car navigation apparatus, a game machine, etc.

As one of the process steps for manufacturing a liquid crystal display device, there is a step of filling the inside of a liquid crystal display panel with a liquid crystal material. A one drop filling (ODF) method has been put into practical use as a method of filling the liquid crystal material. In the ODF method, a frame-shaped seal member is provided on one of a pair of substrates constituting a liquid crystal display panel, and the liquid crystal material is dropped onto an area surrounded by the seal member. After superposing the other substrate on the substrate on which the liquid crystal material has been dropped, the seal member is cured. Thus, the inside of the liquid crystal display panel is filled with the liquid crystal material.

However, in the ODF method, when superposing the substrates, the liquid crystal material spreads toward and contacts the surrounding seal member that is not yet cured. As a result, components of the uncured seal member elutes into the liquid crystal material, thereby polluting the liquid crystal material to cause defective display, such as display unevenness.

DETAILED DESCRIPTION

In general, according to one embodiment, a liquid crystal display device includes an array substrate, a counter substrate disposed opposing the array substrate, an adhesive layer bonding the array and counter substrates at their edge portions, defining a gap inside thereof, a liquid crystal layer provided in the gap, a frame portion including the adhesive layer and extending into the gap, defining an image display area inside thereof. A first barrier member is provided between the array and counter substrates in an area between the inner periphery of the adhesive layer and the inner periphery of the frame portion. A second barrier member is provided between the array and counter substrates at a distance from the first barrier member in an area between the inner periphery of the adhesive layer and the inner periphery of the frame portion. The first barrier member includes a first wall portion having a frame shape and provided on a surface of the array substrate opposing the counter substrate, and a plurality of first pillar portions arranged spaced apart from each other and each having opposite end faces abutting against the first wall portion and the counter substrate. The second barrier member includes a second wall portion having a frame shape and provided on a surface of the counter substrate opposing the array substrate, and a plurality of second pillar portions arranged spaced apart from each other and each having opposite end faces abutting against the second wall portion and the array substrate.

Some embodiments will hereinafter be described, referring to the accompanying drawings. In order to better clarify the description, drawings may more roughly show the width, thickness, shape, etc., of each element than in an actual embodiment. However, these drawings are just examples and do not limit the interpretation of the present invention. In the description and drawings, structural elements having the same or similar functions are denoted by the same reference numbers, and duplication of description thereof may be omitted.

Figure 1:
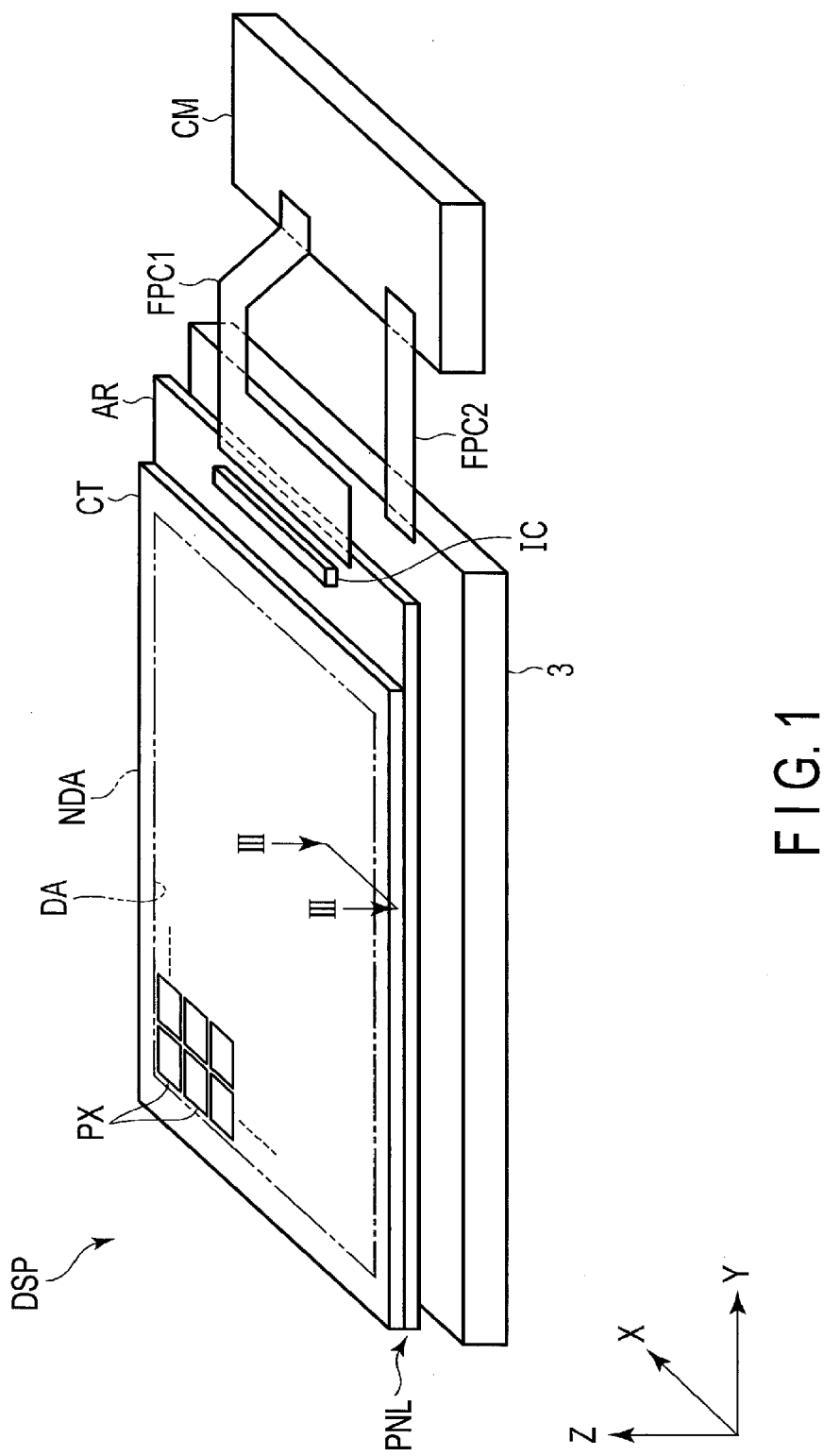
FIG. 1 is a perspective view of a liquid crystal display device according to an embodiment.

FIG. 1 is a perspective view of a liquid crystal display device DSP according to an embodiment. The liquid crystal display device DSP comprises a liquid crystal display panel PNL, a drive IC chip IC for driving the liquid crystal display panel PNL, a light irradiation unit 3 for irradiating the liquid crystal display panel PNL, a control module CM for controlling the operations of the liquid crystal display panel PNL and the light irradiation unit 3, and flexible circuit boards FPC1 and FPC2 for transmitting control signals to the liquid crystal display panel PNL and the light irradiation unit 3. In the embodiment, a first direction X is, for example, the direction of the short side of the liquid crystal display panel PNL. A second direction Y is perpendicular to the first direction X, and is the direction of the long side of the liquid crystal display panel PNL. Further, a third direction Z is perpendicular to the first direction X and the second direction Y.

The liquid crystal display panel PNL comprises an array substrate AR, a counter substrate CT, and a frame portion or area NDA. The array substrate AR and the counter substrate CT are attached to each other at their edge portions by a seal member (adhesive layer), described later, formed in a frame shape between the array substrate AR and the counter substrate CT. The frame area NDA is an area including the seal member, and defines an image display area DA inside thereof.

For instance, in the image display area DA, the liquid crystal display panel PNL comprises pixels PX arranged in a matrix along the first and second directions X and Y. The liquid crystal display panel PNL will be described later in detail.

The light irradiation unit 3 opposes the array substrate AR side of the liquid crystal display panel PNL. The light irradiation unit 3 corresponds to a so-called backlight unit for illuminating the liquid crystal display panel PNL from behind. The driving IC chip IC is mounted on the array substrate AR of the liquid crystal display panel PNL. The flexible circuit board FPC1 is mounted on the array substrate AR, and connects the liquid crystal display panel PNL to the control module CM. The flexible circuit board FPC2 connects the light irradiation unit 3 to the control module CM.

The liquid crystal display device DSP having the above configuration corresponds to a so-called transmissive-type liquid crystal display device having a transmissive display function of selectively transmitting, through the pixels PX, light emitted from the light irradiation unit 3 to the liquid crystal display panel PNL, thereby displaying images. However, the liquid crystal display device DSP may be a so-called semi-transmissive type liquid crystal display device that also has a reflective display function of selectively reflecting, through the pixels PX, light entering the liquid crystal display panel PNL from outside, thereby displaying images. The semi-transmissive type liquid crystal display device may comprise a front light unit provided as a light source on the observer side of the liquid crystal display panel PNL. Hereinafter, the transmissive-type liquid crystal display device will be described as an example.

Signal supply sources, such as the driving IC chip IC and the flexible circuit boards FPC1 and FPC2, for supplying signals necessary to drive the liquid crystal display panels PNL are located in the frame area NDA located outer than the image display area DA. In the illustrated example, the driving IC chip IC and the flexible circuit boards FPC1 and FPC2 are mounted on a mounting portion of the array substrate AR that extends further outward than an end of the counter substrate CT.

The liquid crystal display panel PNL is configured to be able to use modes, such as a TN (Twisted Nematic) mode, an OCH (Optically Compensated Bend) mode, and a VA (Vertical Aligned) mode, which mainly utilize a vertical electric field, and modes, such as an IPS (In-Plane Switching) mode and an FFS (Fringe Field Switching) mode, which mainly utilize a transverse electric field. Hereinafter, a description will be given of a liquid crystal display device using a transverse electric field driving mode, as an example.

Figure 2:
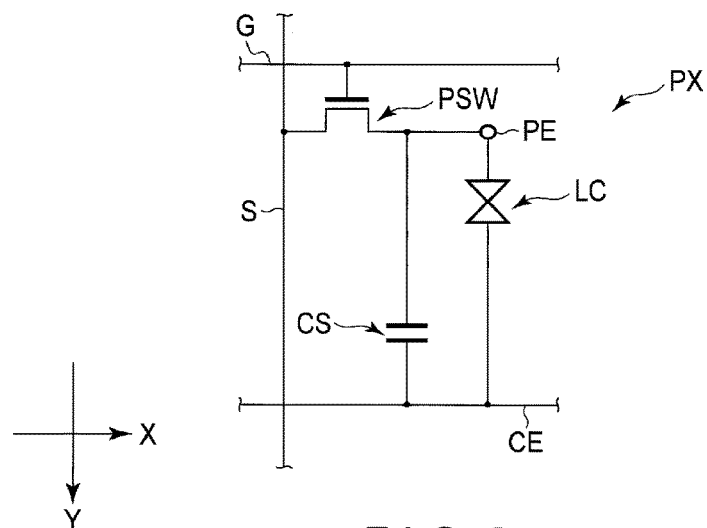
FIG. 2 shows the configuration of a pixel in the liquid crystal display device of the embodiment.

FIG. 2 shows the configuration of a pixel PX. Each pixel PX comprises a switching element PSW, a pixel electrode PE, a common electrode CE, a liquid crystal layer LC, etc.

The switching element PSW is formed of, for example, a thin film transistor (TFT). The switching element PSW is electrically connected to a scanning line G, a signal line S and a pixel electrode PE. For instance, the scanning line G extends along the first direction X, and the signal line S extends along the second direction Y. The scanning line G and the signal line S may be formed straight or to at least have a curved portion. The liquid crystal layer LC is driven by an electric field generated between the pixel electrode PE and the common electrode CE. A holding capacitor CS is an electric capacity formed between, for example, the common electrode CE and the pixel electrode PE.

Figure 3:
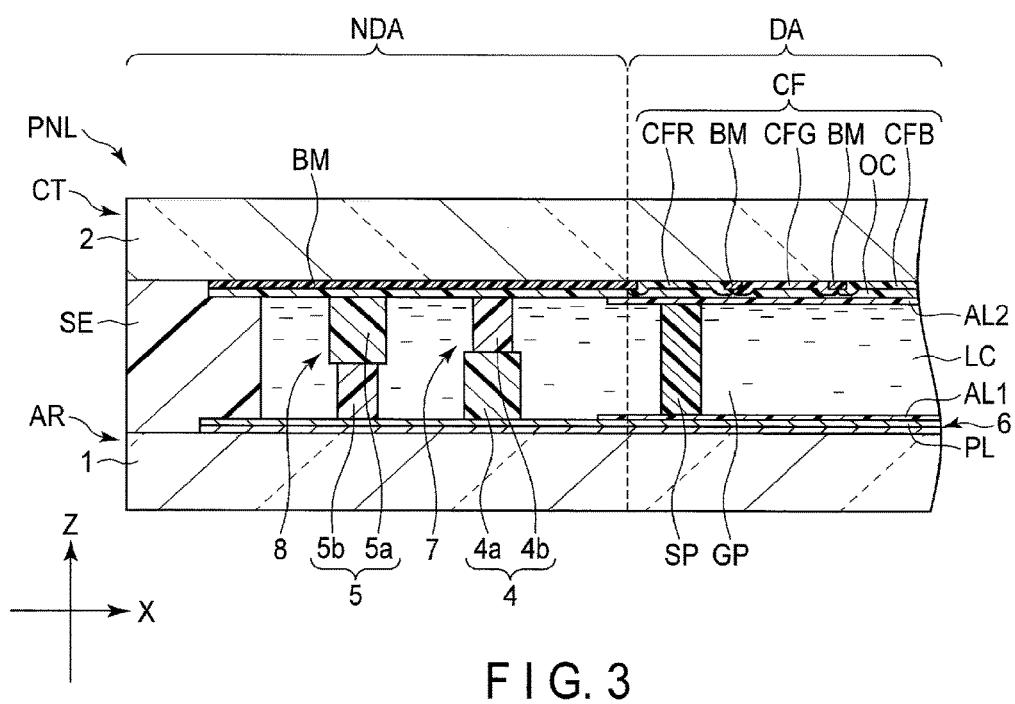
FIG. 3 is a schematic partly-broken cross-sectional view of a liquid crystal display panel.

FIG. 3 is a sectional view of the liquid crystal display panel PNL, taken along line of FIG. 1. The liquid crystal display panel PNL comprises the array substrate AR, the counter substrate CT, the liquid crystal layer LC, the seal member indicated by SE, the frame area NDA, a first barrier member 4 and a second barrier member 5.

The array substrate AR comprises a first substrate 1, a pixel circuit layer 6, and a first alignment layer AL1.

The first substrate 1 is a light-transmissive, electrically insulating substrate such as a glass substrate.

The pixel circuit layer 6 is provided on a surface of the first substrate 1 on the side of the liquid crystal layer LC. The pixel circuit layer 6 includes a counter electrode, a planarization film PL, a pixel electrode, a scanning line, a signal line, a TFT, etc. Since the liquid crystal display device DSP is a liquid crystal display device of a transverse electric field driving mode, the pixel circuit layer 6 includes counter electrodes, and each counter electrode is electrically insulated from a corresponding pixel electrode. The pixel circuit layer 6 can be formed by a known method of forming counter electrodes, planarization films PL, pixel electrodes, scanning lines, signal lines, TFT, etc. The pixel electrodes can be formed of a light-transmissive, electrically conductive material, such as indium tin oxide (ITO) or indium zinc oxide (IZO), or of a light-reflective, electrically conductive material comprising, for example, Ag, Al, an Al alloy, etc. The counter electrodes can be formed of, for example, a light-transmissive, electrically conductive material, such as ITO and IZO. The planarization film PL has a flat surface covering unevenness of the underlying layers, and can be formed of, for example, an organic planarization film PL, such as a hard resin coat (HRC).

The first alignment layer AL1 is provided on a surface of the pixel circuit layer 6 on the side of the liquid crystal layer LC. The first alignment layer AL1 can be formed by a known method of forming an alignment layer. For example, the first alignment layer AL1 can be formed by coating the surface of the pixel circuit layer 6 with an organic material, such as polyimide, and then irradiating this organic thin film with ultraviolet light in a fixed direction. Alternatively, the first alignment layer AL1 can be formed by performing rubbing (rubbing processing) using rubbing clothing, instead of using ultraviolet light.

The counter substrate CT opposes the array substrate AR, and comprises a second substrate 2, a color filter CF and a second alignment layer AL2.

The second substrate 2 is a light-transmissive, electrically insulating substrate, such as a glass substrate.

The color filter CF is provided on a surface of the second substrate 2 on the side of the liquid crystal layer LC. The color filter. CF comprises a black matrix BM, filter segments CFR, CFG and CFB, and an overcoat layer OC.

In the color filter CF, red (R), green (G) and blue (B) filter segments CFR, CFG and CFB (sub-pixels) are arranged periodically. One combination of three-color sub-pixels constitutes one pixel.

The black matrix BM is interposed between the red, green and blue filter segments CFR, CFG and CFB. The black matrix BM is formed in a grating when viewed as a plan view, and is used to partition the red, green and blue filter segments CFR, CFG and CFB to thereby prevent mixture of adjacent colors.

The overcoat layer OC covers the filter segments CFR, CFG and CFB and the black matrix BM, thereby covering the uneven surfaces of the filter segments CFR, CFG, CFB and the black matrix BM to provide a plane surface (planarization film).

The second alignment layer AL2 is provided on a surface of the color filter CF on the side of the liquid crystal layer LC. The second alignment layer AL2 can be formed by a known method of forming an alignment layer. For example, the second alignment layer AL2 can be formed by coating the surface of the color filter CF with an organic material, such as polyimide, and then irradiating the organic thin film with ultraviolet light. Alternatively, the second alignment layer AL2 can be formed by performing rubbing (rubbing processing) using rubbing clothing, instead of using ultraviolet light.

The seal member SE bonds the array substrate AR with the counter substrate CT at their edge portions, thereby defining a gap GP inside thereof. This gap GP can be maintained by a pillar spacer SP formed on the array substrate AR or the counter substrate CT.

The seal member SE is formed in the shape of a frame between the array substrate AR and the counter substrate CT. The seal member SE has no inlet for injecting the liquid crystal material. This seal member SE is formed of, for example, a seal material, such as an ultraviolet-curable resin and a thermosetting resin, and can be formed by a method of continuously performing drawing from a start point to an end point, using, for example, a dispenser.

The liquid crystal layer LC is held in the gap GP between the array substrate AR and the counter substrate CT. More specifically, the liquid crystal layer LC is present between the first and second alignment layers AL1 and AL2.

The frame area NDA includes the seal member SE and extends into the gap GP, thereby defining the image display area DA inside thereof.

The first barrier member 4 is provided between the array substrate AR and the counter substrate CT in an area between the inner periphery of the seal member SE, and the inner periphery of the frame area NDA. The first barrier member 4 comprises a first wall portion 4a and a plurality of first pillar portions 4b.

The first wall portion 4a is provided in the shape of a frame on a surface of the array substrate AR opposing the counter substrate CT, more specifically, on a surface of the planarization film PL of the pixel circuit layer 6 on the side of the liquid crystal layer LC. It is preferable that the first wall portion 4a have a height ½ or greater than the gap GP of the liquid crystal display panel PNL. The first wall portion 4a can be formed of a material, for example, an organic, electrically insulating material, such as an acrylic resin, generally used as the pillar spacer SP for holding the gap of the liquid crystal display panel. Moreover, when forming the first wall portion 4a integral with the array substrate AR as one body, the same material as the planarization film PL, for example, a hard resin coat (HRC), can be used as the material of the first wall portion 4a.

The plurality of first pillar portions 4b are arranged spaced apart from each other over the whole periphery of the first wall portion 4a, such that the opposite end faces of each first pillar portion 4b abut against the first wall portion 4a and the counter substrate CT. More specifically, an end face of the first pillar portion 4b on the side of the counter substrate CT is in contact with a surface of the overcoat layer OC on the side of the liquid crystal layer LC.

In an area between the inner periphery of the seal member SE and the inner periphery of the frame area NDA, the second barrier member 5 is provided between the array substrate AR and the counter substrate CT spaced apart from the first barrier member 4. For instance, the second barrier member 5 is provided between the seal member SE and the first barrier member 4. The second barrier member 5 comprises a second wall portion 5a and a plurality of second pillar portions 5b.

The second wall portion 5a is provided in the shape of a frame on a surface of the counter substrate CT opposing the array substrate AR, more specifically, on a surface of the overcoat layer OC on the side of the liquid crystal layer LC. It is preferable that the second wall portion 5a have a height ½ or greater than the gap GP of the liquid crystal display panel PNL. The second wall portion 5a can be formed of a material, for example, an organic, electrically insulating material, such as an acrylic resin, generally used as the pillar spacer SP for holding the gap of the liquid crystal display panel. Moreover, when providing the pillar spacer SP in the image display area DA for holding the gap GP of the liquid crystal display panel PNL, it is preferable that the same material as that of the pillar spacer SP be used for the second wall portion 5a in order to enable the pillar spacer SP and the second wall portion 5a to be formed in the same process.

The plurality of second pillar portions 5b are arranged spaced apart from each other over the whole periphery of the second wall portion 5a, such that the opposite end faces of each second pillar portion 5b abut against the second wall portion 5a and the array substrate AR. More specifically, an end face of the second pillar portion 5b on the side of the array substrate AR is in contact with on a surface of the planarization film PL of the pixel circuit layer 6 on the side of the liquid crystal layer LC.

Figure 4:
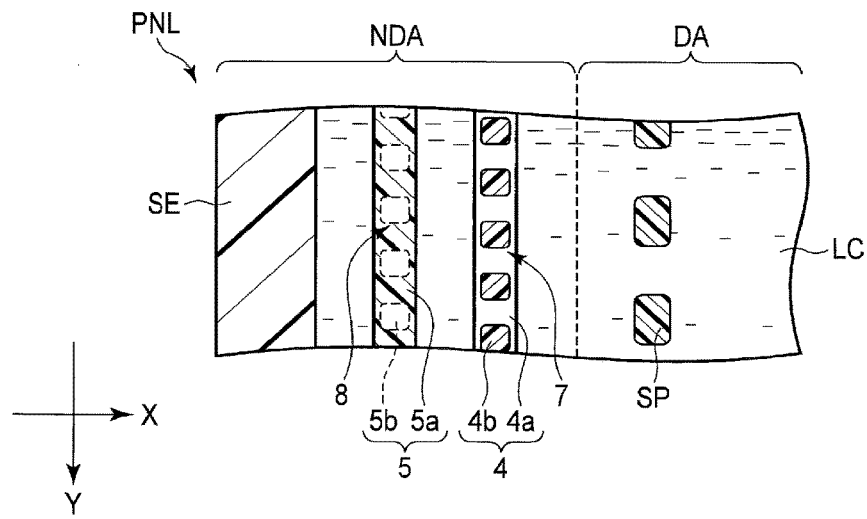
FIG. 4 is a plan view of the liquid crystal display panel for explaining the structure of first and second barrier members.

FIG. 4 is a plan view of the liquid crystal display panel PNL, for explaining the structures of the first barrier member 4 and the second barrier member 5. As shown in FIG. 4, the plurality of pillar portions 4b are arranged spaced apart from each other. First narrow passages 7 for permitting liquid crystal to pass therethrough are defined between respective pairs of adjacent first pillar portions 4b. Although FIG. 4 shows an example where the first narrow passages 7 have a constant width, they may have different widths. The first pillar portions 4b can be formed of a material, for example, an organic, electrically insulating material, such as acrylic resin, which is generally used for the pillar spacer SP for holding the gap of the liquid crystal display panel. Similarly, as shown in FIG. 4, the plurality of second pillar portions 5b are arranged spaced apart from each other. Second narrow passages 8 for permitting liquid crystal to pass therethrough are defined between respective pairs of adjacent second pillar portions 5b. Although FIG. 4 shows an example where the second narrow passages 8 have the same width, the second narrow passages may have different widths. The second pillar portions 5b can be formed of an organic, electrically insulating material, such as acrylic resin, which is generally used for the pillar spacer SP for holding the gap of the liquid crystal display panel. Moreover, when forming the second pillar portions 5b integral with the array substrate AR as one body, the same material as the planarization film PL, such as a hard resin coat (HRC), can also be used for the second pillar portions 5b.

An example of manufacturing the first barrier member 4 will be described. First, the first wall portion 4a and the first pillar portions 4b are formed by photolithography on the planarization film PL of the pixel circuit layer 6 and on the overcoat layer OC, respectively. Next, the first barrier member 4 is formed by stacking the array substrate AR and the counter substrate CT so that the first wall portion 4a and the first pillar portions 4b will be brought into contact.

Further, an example of manufacturing the second barrier member 5 will be described. First, the second wall portion 5a and the second pillar portions 5b are formed by photolithography on the overcoat layer OC, and on the planarization film PL of the pixel circuit layer 6, respectively. Next, the second barrier member 5 is formed by stacking the array substrate AR and the counter substrate CT so that the second wall portion 5a and the second pillar portions 5b will be brought into contact.

In FIGS. 3 and 4, the first and second pillar portions 4b and 5b are square pillars. However, the first and second pillar portions 4b and 5b are not limited to this shape, but may be, for example, columnar or triangular pillars.

Further, in FIGS. 3 and 4, the first barrier member 4 is located inside the second barrier member 5. However, the liquid crystal display panel PNL may be configured such that the second barrier member 5 is located inside the first barrier member 4. Moreover, the second barrier member 5 is provided at a distance from the seal member SE. However, one of the first and second barrier members 4 and 5, which is closer to the seal member SE, may be in contact with the seal member SE.

The liquid crystal layer LC can be formed by an ODF method. More specifically, the material of the seal member SE is dropped onto a predetermined area of the array substrate AR or the counter substrate CT. After that, a predetermined amount of a liquid crystal material is dropped onto the substrate provided with the seal member SE, and is diffused by superposing the array substrate AR and the counter substrate CT in a vacuum. Next, the seal member SE is cured to fix a cell gap GP between the stacked substrates. Different methods are employed to cure seal members SE formed of different materials. For instance, when an ultraviolet-curable type seal member SE is used, it is cured by, for example, applying ultraviolet rays thereto.

In the above-described process of forming the liquid crystal layer LC, the liquid crystal material dropped on the array substrate AR or the counter substrate CT gradually diffuses from the dropped position toward the seal member SE at the edge portions of the liquid crystal display panel PNL when the substrates are superposed on each other, passes through the first and second narrow passages 7 and 8, and reaches the seal member SE. Since the first narrow passages 7 are formed on the counter substrate CT side and the second narrow passages 8 are formed on the array substrate AR side, the liquid crystal material diffuses to vertically thread its way in the gap GP of the liquid crystal panel PNL. Therefore, the distance covered by the dropped liquid crystal material until reaching the seal member SE is longer than a case where neither of the first and second barrier members 4 and 5 is provided. As a result, the time required for the dropped liquid crystal material to reach the seal member SE becomes longer, which enables the seal member SE to be cured during the time to thereby suppress contact between the uncured seal member and the liquid crystal material.

Also, the first and second pillar portions 4b and 5b are smaller than the first and second wall portions 4a and 5a in the contact area with respect to the array substrate AR or the counter substrate CT, and are therefore more elastically deformable than the latter. Accordingly, when external pressure or some shock has been applied to the liquid crystal display device DSP, the first and second barrier members 4 and 5 will be deformed to thereby absorb the pressure or shock. Further, the absorbance of, for example, pressure by the first or second barrier member 4 or 5 can be adjusted by adjusting the arrangement concentration of the first or second pillar portions 4b or 5b (i.e., the number of first or second pillar portions 4b or 5b per unit area).

Furthermore, the first and second barrier members 4 and 5 can reduce the speed of diffusion of the liquid crystal material from the edge portions of the liquid crystal display panel PNL toward the image display area DA, thereby suppressing diffusion, into the image display area DA, of various impurities, such as moisture entering the liquid crystal layer LC through the seal member SE.

Although FIGS. 3 and 4 show a liquid crystal display panel example PNL that comprises a single first barrier member 4 and a single second barrier member 5, it is preferable that the liquid crystal display panel PNL have a plurality of first barrier members 4 and a plurality of second barrier members 5. For example, it is desirable that an even number of first barrier members 4 and an odd number of second barrier members 5 be employed such that a single second barrier member 5 is interposed between each pair of adjacent first barrier members 4. Alternatively, it is desirable that an odd number of first barrier members 4 and an even number of second barrier members 5 be employed such that a single first barrier member 4 is interposed between each pair of adjacent second barrier members 5. Yet alternatively, it is preferable that the liquid crystal display panel PNL have a plurality of first barrier members 4 and a plurality of second barrier members 5, and that the first and second barrier members 4 and 5 are arranged alternately.

Figure 5:
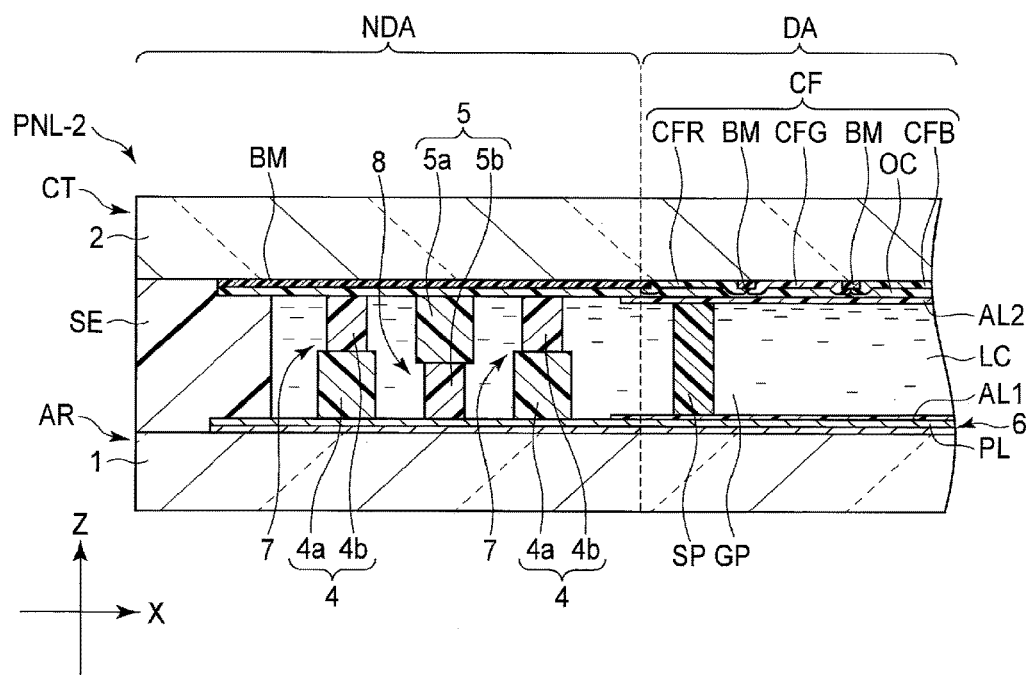
FIG. 5 is a schematic partly-broken cross-sectional view of a liquid crystal display panel.

FIG. 5 is a sectional view of a liquid crystal display panel PNL-2 equipped with two first barrier members 4 and a second barrier member 5. The liquid crystal display panel PNL-2 has a similar structure to the liquid crystal display panel PNL shown in FIG. 3, except that in the former, the second barrier member 5 is interposed between the two first barrier members 4.

The provision of a plurality of first barrier members and/or second barrier members and alternate arrangement of the first and second barrier members further increase the distance covered by a liquid crystal material dropped onto the array substrate AR or the counter substrate CT until it diffuses from the dropped position toward the edge portions of the liquid crystal display panel PNL, and then reaches the seal member SE. As a result, the time required for the dropped liquid crystal material to reach the seal member SE becomes further longer, which enables the seal member SE to be cured during the time to thereby further suppress contact between the uncured seal member and the liquid crystal material.

As described above, according to the present invention, in the process of forming a liquid crystal layer, contamination of the liquid crystal layer due to contact between the liquid crystal material and the uncured seal member can be reduced. Moreover, diffusion of impurities of the seal member into the display area can be suppressed. Accordingly, a liquid crystal display device of a high display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   an array substrate;
   a counter substrate disposed opposing the array substrate;
   an adhesive layer bonding the array and counter substrates at their edge portions, defining a gap inside thereof;
   a liquid crystal layer provided in the gap;
   a frame portion including the adhesive layer and extending into the gap, defining an image display area inside thereof;
   a first barrier member provided between the array and counter substrates in an area between an inner periphery of the adhesive layer and an inner periphery of the frame portion; and
   a second barrier member provided between the array and counter substrates and spaced apart from the first barrier member in the area between the inner periphery of the adhesive layer and the inner periphery of the frame portion, wherein the first barrier member comprises:
- a first wall portion provided on a surface of the array substrate opposing the counter substrate, and having a frame shape and a lower height compared to the gap; and
- a plurality of first pillar portions provided on a surface of the counter substrate opposing the array substrate, arranged spaced apart from each other, and each having opposite end faces abutting against the first wall portion and the counter substrate, and the second barrier member comprises:
- a second wall portion provided on the surface of the counter substrate opposing the array substrate, and having a frame shape and a lower height compared to the gap; and
- a plurality of second pillar portions provided on the surface of the array substrate opposing the counter substrate, arranged spaced apart from each other, and each having opposite end faces abutting against the second wall portion and the array substrate, wherein a width of the first wall portion is wider than a width of the first pillar portion and a width of the second wall portion is wider than a width of the second pillar portion.

2. The liquid crystal display device of claim 1, wherein two first barrier members are provided, and one second barrier member is provided, wherein the one second barrier member is interposed between the two first barrier members.

3. The liquid crystal display device of claim 1, wherein one first barrier member is provided, and two second barrier members are provided, wherein the one first barrier member is interposed between the two second barrier members.

4. The liquid crystal display device of claim 1, wherein the first barrier member is provided in plural number, and the second barrier member is provided in plural number, wherein the first and second barrier members are provided alternately.

5. The liquid crystal display device of claim 1, wherein the first or second wall portion has a height not less than ½ of the gap.

6. The liquid crystal display device of claim 2, wherein the first or second wall portion has a height not less than ½ of the gap.

7. The liquid crystal display device of claim 3, wherein the first or second wall portion has a height not less than ½ of the gap.

8. The liquid crystal display device of claim 4, wherein the first or second wall portion has a height not less than ½ of the gap.

9. The liquid crystal display device of claim 1, further comprising a pillar spacer provided in the gap in the image display area for holding the gap, wherein
the second wall portion is formed of a same material as the pillar spacer.

10. The liquid crystal display device of claim 6, further comprising a pillar spacer provided in the gap in the image display area for holding the gap, wherein
the second wall portion is formed of a same material as the pillar spacer.

11. The liquid crystal display device of claim 7, further comprising a pillar spacer provided in the gap in the image display area for holding the gap, wherein
the second wall portion is formed of a same material as the pillar spacer.

12. The liquid crystal display device of claim 8, further comprising a pillar spacer provided in the gap in the image display area for holding the gap, wherein
the second wall portion is formed of a same material as the pillar spacer.

13. The liquid crystal display device of claim 1, wherein the first and second barrier members comprise an acrylic resin.

14. The liquid crystal display device of claim 10, wherein the first and second barrier members comprise an acrylic resin.

15. The liquid crystal display device of claim 11, wherein the first and second barrier members comprise an acrylic resin.

16. The liquid crystal display device of claim 12, wherein the first and second barrier members comprise an acrylic resin.

17. The liquid crystal display device of claim 1, wherein
a surface of the array substrate opposing the counter substrate is provided with a film having a planar surface, and the first wall portion and/or the second pillar portion is formed of a same material as the film having the planar surface.

18. The liquid crystal display device of claim 14, wherein
a surface of the array substrate opposing the counter substrate is provided with a film having a planar surface, and the first wall portion and/or the second pillar portion is formed of a same material as the film having the planar surface.

19. The liquid crystal display device of claim 15, wherein
a surface of the array substrate opposing the counter substrate is provided with a film having a planar surface, and the first wall portion and/or the second pillar portion is formed of a same material as the film having the planar surface.

20. The liquid crystal display device of claim 16, wherein
a surface of the array substrate opposing the counter substrate is provided with a film having a planar surface, and the first wall portion and/or the second pillar portion is formed of a same material as the film having the planar surface.

* * * * *